Oct. 7, 1924.
A. FERRARI
1,510,547
GRIDIRON
Filed Nov. 19, 1919
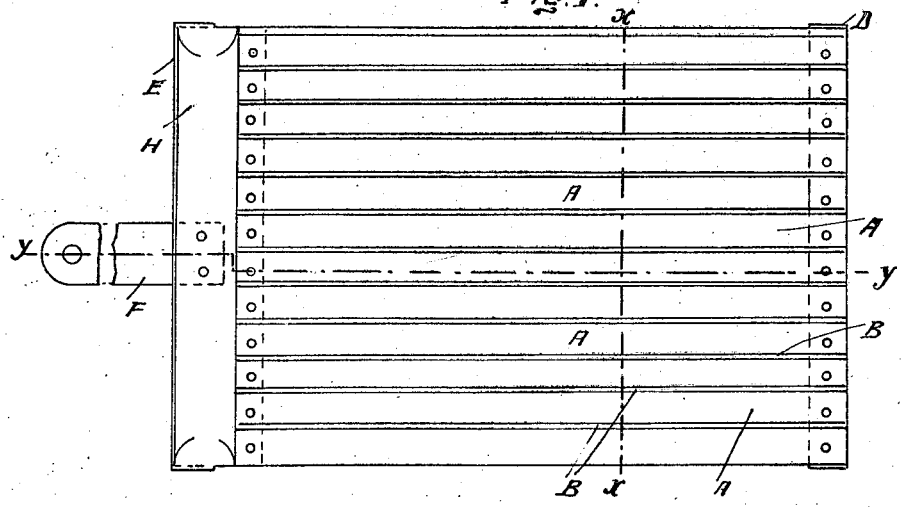
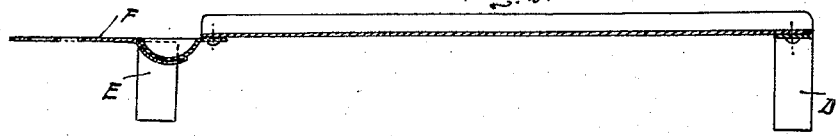
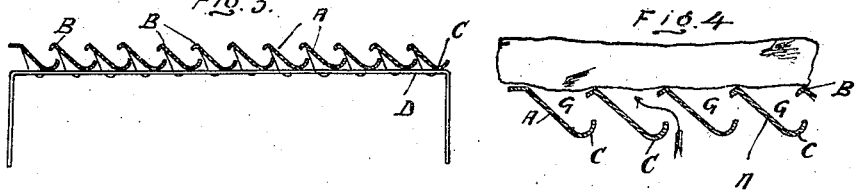
Inventor:
Alfredo Ferrari.
per H. W. Plucker
Attorney.

Patented Oct. 7, 1924.

1,510,547

UNITED STATES PATENT OFFICE.

ALFREDO FERRARI, OF SPEZIA, ITALY.

GRIDIRON.

Application filed November 19, 1919. Serial No. 339,155.

*To all whom it may concern:*

Be it known that I, ALFREDO FERRARI, a subject of the King of Italy, residing at 19 Via Chiodo, Spezia, in the Kingdom of Italy, have invented new and useful Improvements in Gridirons, of which the following is a specification.

The present invention relates to a cooking gridiron comprising bars partially overlapping one another and fitted with troughs to receive the juice and prevent it from falling onto the fire.

One form of the invention is illustrated in the annexed drawing by way of example.

Fig. 1 is a plan showing a gridiron constructed according to the invention.

Fig. 2 is a section on the line *y—y* in Fig. 1.

Fig. 3 is a section on the line *x—x* in Fig. 1.

Fig. 4 is a part cross section to a larger scale.

According to the drawing the gridiron comprises a plurality of iron bars A, trough or gutter shaped in section, extending downwards in oblique direction and forming channels C at their bottom ends and bent to form sharp or rounded edges B at the top ends of one side wall. The various bars are resting on cross-bearers D and E, the rear bearer D being arranged at a higher level than the front bearer E in order to give the bearers a forward slope. Each bar is so arranged that its channel or trough C lies right under the top sharp or rounded edge B of the adjacent bar. The various troughs C pour into a common collector H arranged near the gridiron handle F, the latter being rigidly secured to the gridiron bearer E. A free space G is thus left between the bars for the heat to pass through, in order to cook the meat P on the gridiron, whilst the juice and fat melted by the heat runs down the top edges B and sloping sides of the bars A into the troughs C and thence into the collector H and does not drop into the fire.

The heat rises through the air spaces between the bars, as indicated by the arrows.

Having now described my invention and how the same is to be carried out, what I claim as my invention is:

A gridiron comprising a pair of cross-bearers, spaced parallel bars supported at their ends on said cross-bearers and sloping towards one of the cross-bearers, the upper parts of the bars being of angular form and the lower parts being of channel form and overlapped by the upper part so as to receive all the juices from between the said upper parts and to convey such juices along their sloping surfaces, and a juice collecting trough formed in one of the cross-bearers for receiving the juice from the sloping channels.

ALFREDO FERRARI.

Witnesses:
W. P. SHOCKLEY,
D. VANNONCINI.